United States Patent
Fujii

(10) Patent No.: US 7,604,401 B2
(45) Date of Patent: Oct. 20, 2009

(54) SUBSTRATE TEMPERATURE MEASUREMENT APPARATUS AND PROCESSING APPARATUS

(75) Inventor: Yoshinori Fujii, Susono (JP)

(73) Assignee: UL Vac, Inc., Kanagawa (JP)

( * ) Notice: Subject to any disclaimer, the term of this patent is extended or adjusted under 35 U.S.C. 154(b) by 271 days.

(21) Appl. No.: 10/580,946

(22) PCT Filed: Jun. 17, 2005

(86) PCT No.: PCT/JP2005/011131

§ 371 (c)(1),
(2), (4) Date: May 30, 2006

(87) PCT Pub. No.: WO2006/003798

PCT Pub. Date: Jan. 12, 2006

(65) Prior Publication Data

US 2007/0086503 A1    Apr. 19, 2007

(30) Foreign Application Priority Data

Jul. 1, 2004    (JP) ............... 2004-195968

(51) Int. Cl.
*G01K 7/02* (2006.01)
*H01L 35/04* (2006.01)

(52) U.S. Cl. .............. 374/179; 374/163; 374/208; 374/183; 136/200; 136/232

(58) Field of Classification Search .......... 374/179, 374/208, 45, 121, 180, 135, 29, 30, 141, 374/163, 183; 136/200, 213, 232, 230, 233; 29/469.5, 505

See application file for complete search history.

(56) References Cited

U.S. PATENT DOCUMENTS

| | | | | |
|---|---|---|---|---|
| 3,016,412 A * | 1/1962 | Ross | ................ | 136/214 |
| 3,143,439 A * | 8/1964 | Hansen | ................ | 136/229 |
| 3,376,170 A * | 4/1968 | Logan et al. | ................ | 136/233 |
| 4,018,624 A * | 4/1977 | Rizzolo | ................ | 136/233 |
| 4,265,117 A * | 5/1981 | Thoma et al. | ................ | 136/221 |
| 4,934,831 A * | 6/1990 | Volbrecht | ................ | 374/183 |
| 5,176,451 A * | 1/1993 | Sasada et al. | ................ | 374/179 |
| 5,527,111 A * | 6/1996 | Lysen et al. | ................ | 374/208 |
| 6,025,554 A * | 2/2000 | Macris | ................ | 136/205 |
| 6,040,518 A * | 3/2000 | Kinnard | ................ | 136/201 |
| 6,204,502 B1 * | 3/2001 | Guilmain et al. | ................ | 250/353 |
| 6,464,393 B2 * | 10/2002 | Tatoh | ................ | 374/179 |
| 6,634,788 B2 * | 10/2003 | Ruppert et al. | ................ | 374/179 |
| 6,830,374 B1 * | 12/2004 | Gray | ................ | 374/179 |
| 7,090,394 B2 * | 8/2006 | Hashikura et al. | ................ | 374/179 |
| 2003/0217767 A1 * | 11/2003 | Kushihashi et al. | ................ | 136/230 |

FOREIGN PATENT DOCUMENTS

| JP | 58-28536 B | | 6/1983 |
|---|---|---|---|
| JP | 60071924 A | * | 4/1985 |
| JP | 61-028027 U | | 2/1986 |
| JP | 64-035228 A | | 2/1989 |
| JP | 6-112303 | | 4/1994 |
| JP | 7-221154 A | | 8/1995 |

* cited by examiner

*Primary Examiner*—Gail Verbitsky
(74) *Attorney, Agent, or Firm*—Carothers & Carothers

(57) ABSTRACT

A substrate temperature measurement apparatus and a processing apparatus, whereby thermocouple wire reliability is improved, influence of infrared rays on the chip is reduced and the temperature of the substrate can be accurately measured. A chip (16) made of metal material reflecting infrared rays and electromagnetic waves, has an insertion opening (16a) for inserting thermocouple wires (20a, 20b) is crushed and deformed with the thermocouple wires inserted, and thereby united together with the thermocouple wires, and contacted with the substrate (13); and a supporting member or members (15b, 15c), made of material of lower thermal conductivity than said chip (16), are provided for supporting said chip (16).

13 Claims, 12 Drawing Sheets

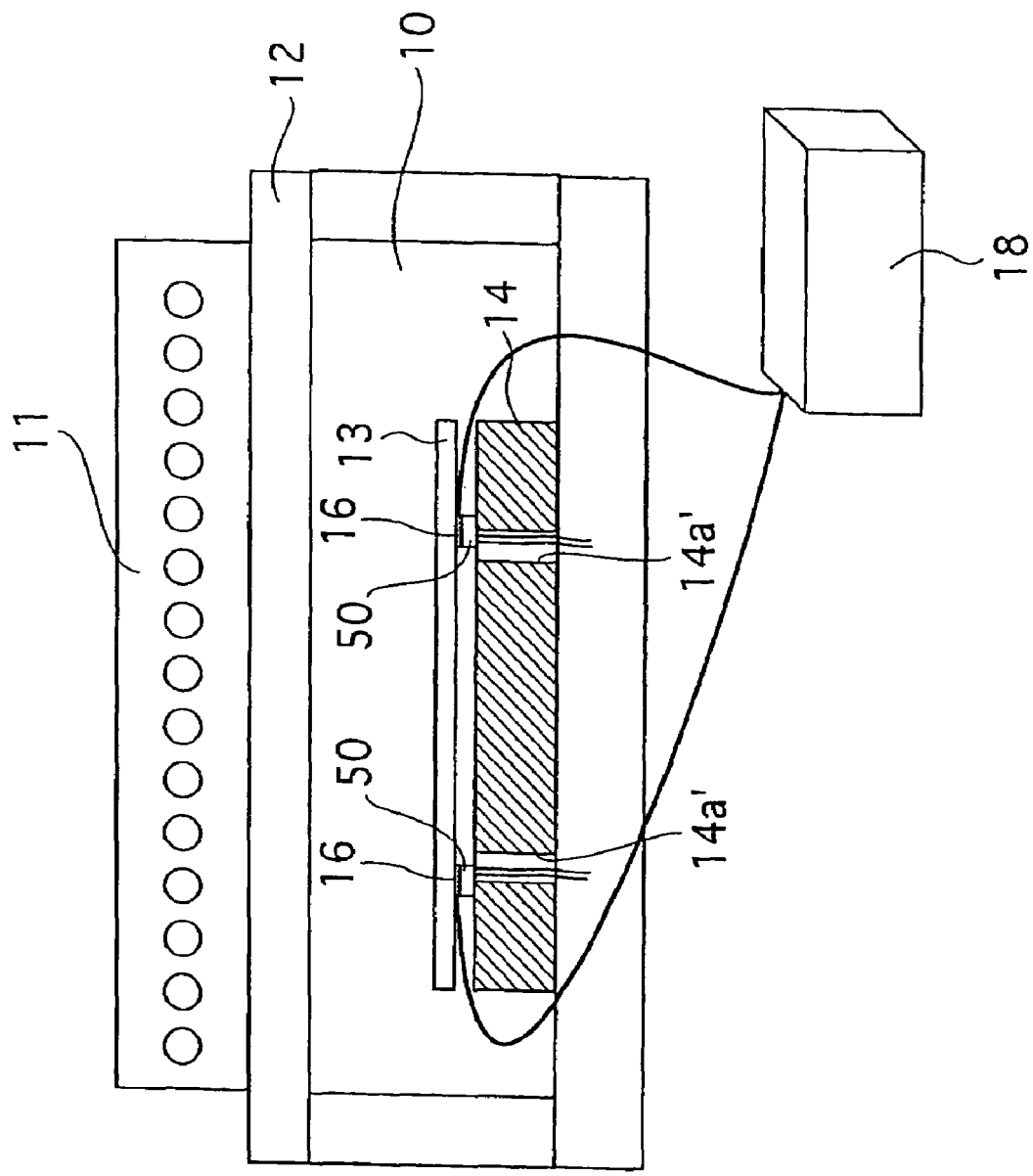

SUBSTRATE TEMPERATURE MEASUREMENT APPARATUS AND PROCESSING APPARATUS

TECHNICAL FIELD

This invention relates to a substrate temperature measurement apparatus for measuring the temperature of a substrate heated with infrared rays or processed under plasma generating circumstances, and a processing apparatus provided with the substrate temperature measurement apparatus.

BACKGROUND OF THE INVENTION

For example, when a film is formed or ions are implanted onto a semiconductor wafer or glass substrate under heated conditions, it is necessary to measure the temperature of the substrate accurately to control the temperature of the substrate. Previously thermocouple wires were used for measuring the temperature of the substrate. For example, a chip is attached to top ends of two thermocouple wires as a temperature measurement contact point in the following patent document:

Patent Document 1: JP58-28536B

DISCLOSURE OF INVENTION

Problem to be Solved by the Invention

The chip contacts with the substrate. Heat is transferred on to the chip from the substrate. The temperature of the substrate is measured under the heating condition of infrared rays. The chip absorbs the infrared ray and so the chip is heated. Accordingly the temperature of the substrate cannot be properly measured.

FIG. 15 is a graph of time-temperature changes of the substrate with a chip contacted with the substrate (dot-dash line) and with the measurement contact of the thermocouple wires directly connected to the substrate (solid line) without using a chip. The substrate to be measured is a silicon substrate covered, as whole, with $SiO_2$ which is supported by three supporting members. Chips are fixed onto the two supporting members. Accordingly, two dot-dash lines are shown in the graph for the two chips, respectively. AlN is used as the material of the chip, which has high thermal conductivity and high heat resistance.

Infrared rays pass through the silicon substrate covered with $SiO_2$. The chip absorbs the infrared rays. Accordingly, the temperature measured by the chip (dot-dash line) is higher than the actual temperature of the substrate (solid line) as shown in FIG. 15.

In the above patent document, a chip and thermocouple wires are put in a protecting pipe, the top end of the pipe is heated and melted to unite the chip and top ends of the thermocouple wires to each other. The thermocouple wires are heated and oxidized and they become fragile. When they have a fine diameter, there is the fear that they will be cut. When the thermocouple wires have a large diameter, much heat is consumed by the thermocouple wires. Further, the heating and melting process requires much cost. Also in he case that the substrate is processed under the plasma generating condition, in controlling the temperature of the substrate, there are the same problems as the above. Electromagnetic waves from the plasma does not make the temperature of the substrate measure accurately.

This invention has been made in consideration of the above mentioned problems. The object is to provide a substrate temperature measurement apparatus and a processing apparatus, whereby thermocouple wire reliability is improved, influence of infrared rays on the chip is reduced and the temperature of the substrate can be accurately measured Means for Solving Problem The substrate temperature measurement apparatus of this invention is characterized in that it is provided with a chip made of metal reflecting infrared rays or electromagnetic waves, which has an insertion opening for inserting the thermocouple wires. The chip is crushed or deformed together with the thermocouple wires and contacted with the substrate, and a supporting member or members for supporting the chip, made of material of lower thermal conductivity than the chip, is provided.

The processing apparatus of this invention is characterized in that it is provided with a processing chamber, in which a substrate to be temperature-measured, is arranged, with a chip made of metal reflecting infrared rays or electromagnetic waves, which has an insertion opening for inserting thermocouple wires. The chip is crushed together with the thermocouple wires and contacted with the substrate, and a supporting member or members for supporting the chip and made of material of lower thermal conductivity than the chip is provided.

The heat of the substrate heated by the infrared rays, or any other heating means, is transmitted to the chip attached to the substrate and further transmitted to the thermocouple wires united with the chip to measure the temperature of the substrate. Since the chip is made of metal, the heat transferred from the substrate is not suppressed. The temperature of the substrate can be measured with accuracy. The material of the chip reflects infrared rays and electromagnetic waves and it does not absorb them. Accordingly, an undesired temperature rise is suppressed. The temperature can be accurately measured in accordance with the heat transferred from the substrate.

The material of the supporting member supporting the chip has a lower thermal conductivity than the chip. The thermal resistance between the chip and the supporting member is high. Accordingly, heat can be prevented from being led toward the supporting members. Undesired decrease of the temperature of the substrate during processing is suppressed.

Since the chip and the thermocouple wires are united with each other by crushing and deforming the chip, the thermocouple wires can be protected from being oxidized and becoming fragile, and thereby being cut. The lifetime is prolonged. Further, since a heating process for the chip and thermocouple wires is not required, the cost can be reduced.

EFFECT OF THE INVENTION

According to this invention, thermocouple wires are used with high reliably. The chip united with the thermocouple wires reflects infrared rays and electromagnetic waves. Accordingly, the temperature of the chip changes accurately in accordance with the transferred heat from the substrate. Thus, the temperature of the substrate can be measured with accuracy, and therefore the temperature control means of the infrared ray heater can be controlled with accuracy. Thus, the quality of the substrate can be improved.

BRIEF DESCRIPTION OF THE DRAWINGS

FIG. 16 is a schematic view of a variation of the embodiment.

Figure 1:
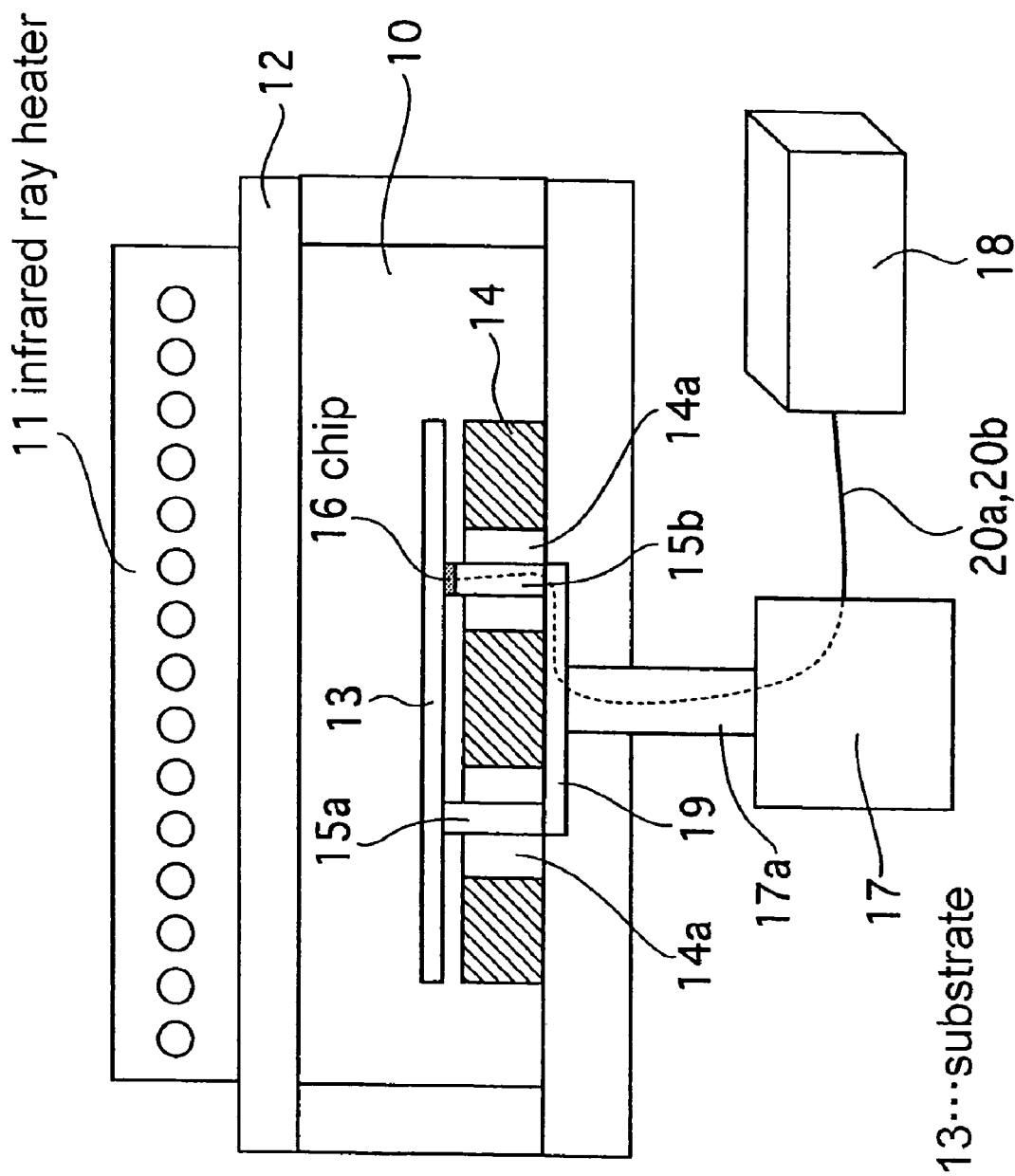
FIG. 1 is a schematic view of a processing apparatus and a substrate temperature measurement apparatus according to a first embodiment of this invention.

Explanations of Letters or Numerals 10 processing chamber
11 infrared ray heater
13 substrate
15a~15c supporting member
16 chip
16a insertion opening
20a, 20b thermocouple wires
22 supporting member
26 supporting member
30 chip
31 supporting member
32 chip
33 shaking means
39 supporting member
35 chip
35a insertion opening
36 chip
36a insertion opening
37 chip
37a insertion opening
38 chip
38a, 38b insertion openings

BEST EMBODIMENT OF INVENTION

Next, embodiments of this invention will be described with reference to the drawings.

First Embodiment

FIG. 1 shows a processing apparatus and substrate temperature measurement apparatus according to a first embodiment of this invention. A quartz plate 12 is arranged above a processing chamber 10. An infrared ray heater 11 is arranged above the quartz plate 12. It is a halogen lamp irradiating infrared rays.

Figure 2:
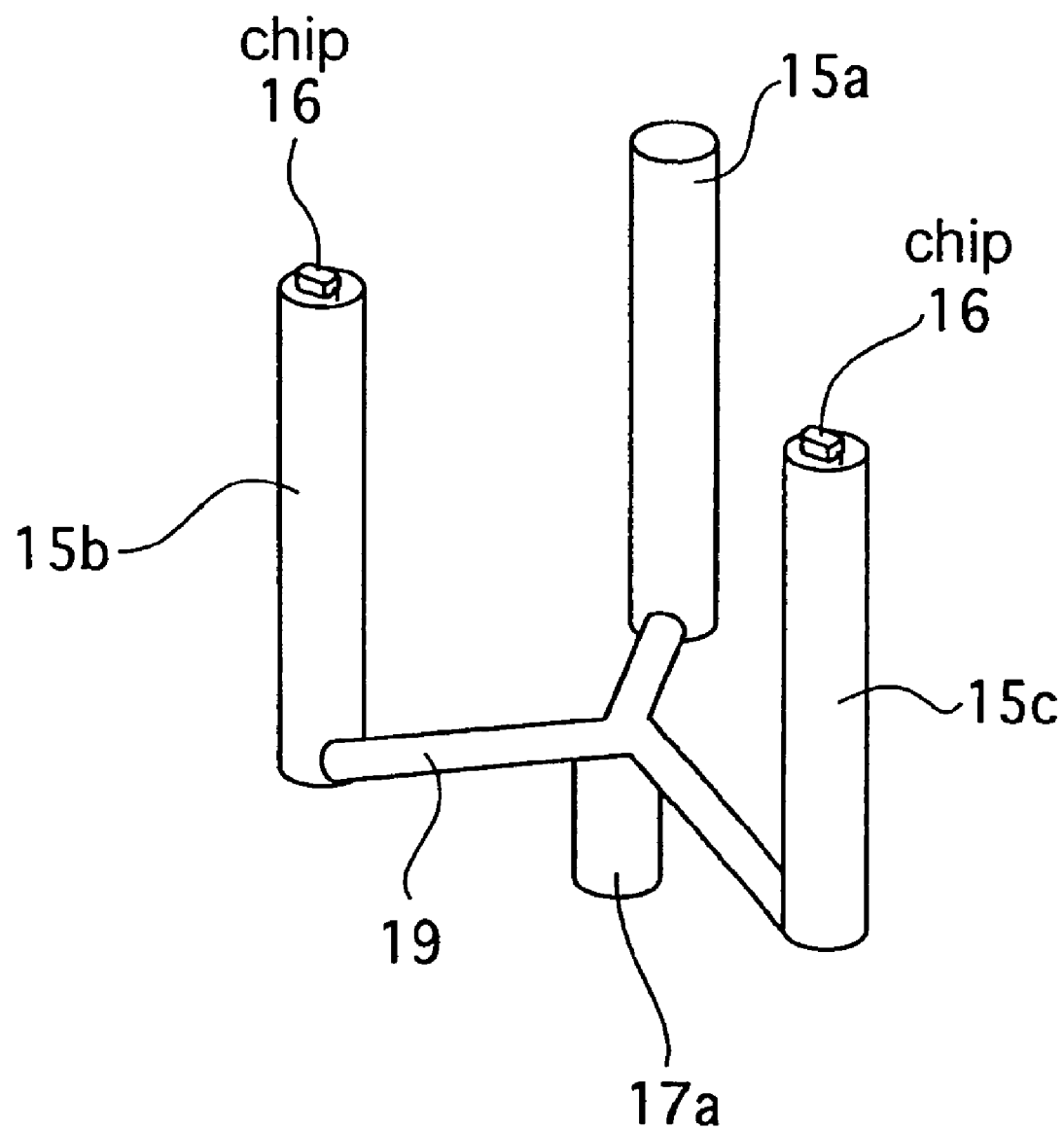
FIG. 2 is an enlarged perspective view of supporting members according to the first embodiment.

A stage 14 is arranged in the processing chamber 10. Spaces 14a are formed in the stage 14 and they allow supporting members 15a, 15b and 15c to protrude therethrough. The supporting member 15c is shown in FIG. 2. The supporting members 15a, 15b and 15c are raised in the thickness direction of the stage 14 by a lift cylinder 17 such as an air cylinder.

FIG. 2 shows a perspective view of the supporting members 15a, 15b and 15c in this embodiment. They are three in number, and are connected together through a three-pronged connecting member 19 to a drive rod 17a of the lift cylinder 17. They are raised as one unit. They are made of quartz material.

Figure 3:
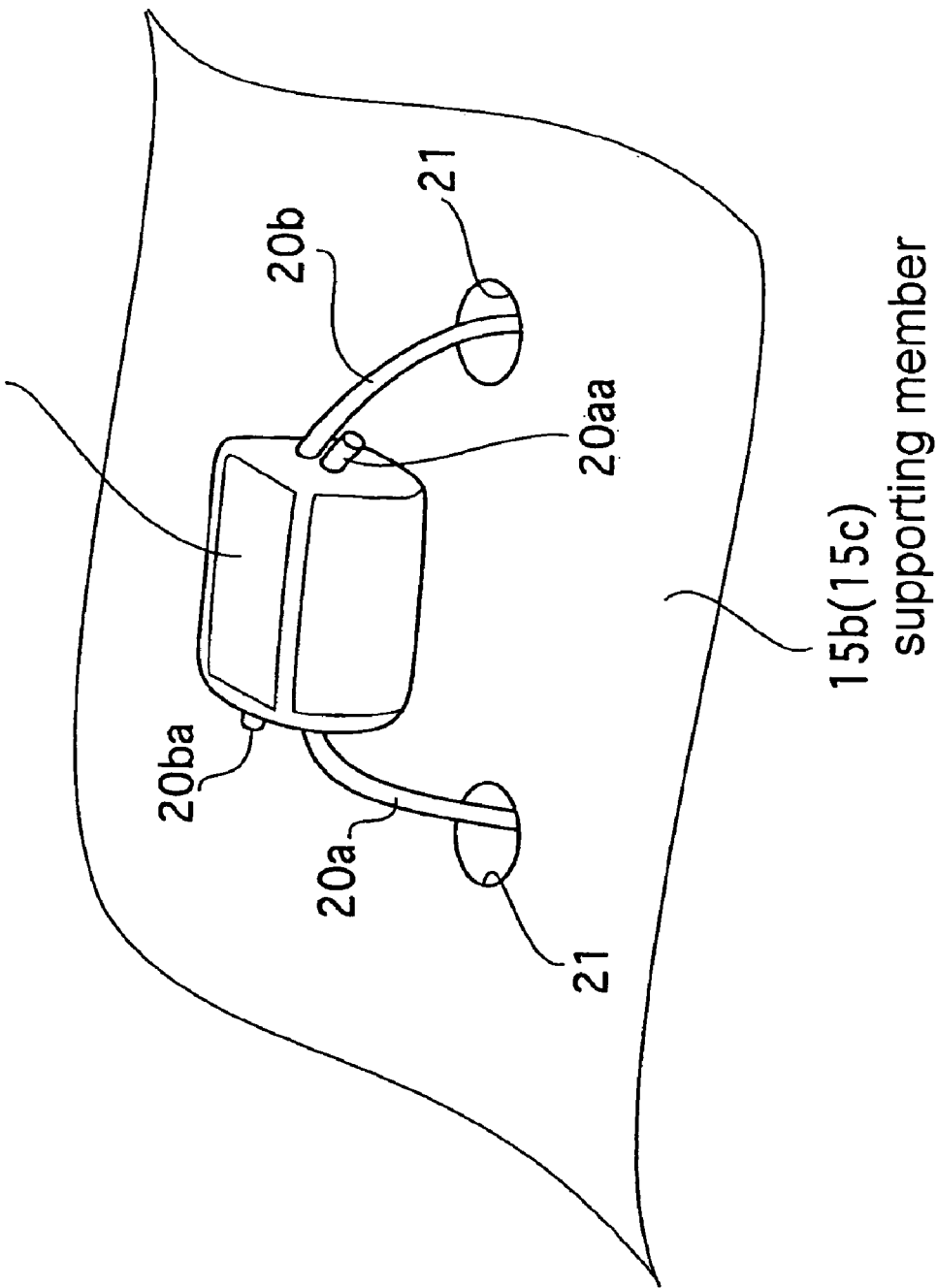
FIG. 3 is an enlarged perspective view of an important portion in FIG. 2.

Chips 16 united with thermocouple wires 20a and 20 are attached to top ends of the supporting members 15b and 15c as shown in FIG. 3.

Figure 9:
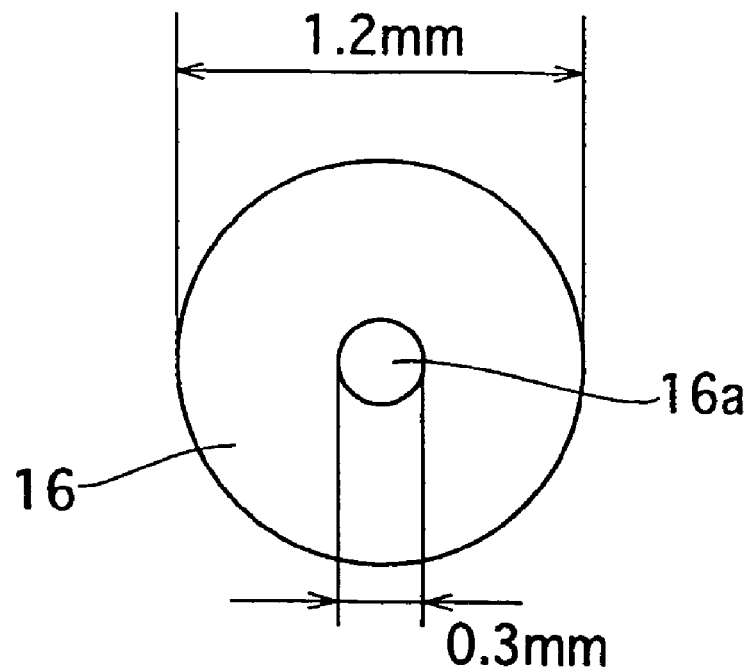
FIG. 9 is a side view of the chip according to the first embodiment of this invention.

FIG. 9 shows a side view of the chip 16 which is to be united with the thermocouple wires 20a and 20b. It is cylindrical and hollow. The thermocouple wires 20a and 20b are inserted into the hollow through the insertion opening 16a. For example, the chip 16 is 1.2 mm in outer diameter and 1.2 mm in length. Inner diameter of the inserting opening 16a is equal to 0.3 mm.

Thermocouple wire 20a, for example, 0.127 thick in diameter is inserted into the one insertion opening 16a of the chip 16 and thermocouple wire 20b, for example, 0.127 thick in diameter is inserted into the other insertion opening 16a of the chip 16. Top ends 20aa and 20ba of the thermocouple wires 20a and 20b are projected out through the opposite insertion openings 16a as shown in FIG. 3.

The chip 16 is crushed and deformed by mechanical pressure so that the insertion openings 16a are closed, and it becomes hexahedron-like as shown in FIG. 3. The corners are rounded. The thickness of the crushed chip 16 is equal to about 0.6 mm to 0.7 mm. Thus the chip 16 is united together with the thermocouple wires 20a and 20b which are connected to each other in the deformed hollow. A different metal of lower resistance may be interposed between the thermocouple wires because inducted electric power is changed little by such an interposed different metal. Thus, they always need not to be directly connected to each other.

When the projected end portions of the thermocouple wires are too long, they are cut to be shortened. The cutout end portion 20aa and 20ba are shown in FIG. 3.

The top surface of the chip 16 is flat and is to be contacted to the substrate 13. In FIG. 3, the lower surface of the chip 16 is fixed to the top end of the supporting members 15b(15c) by adhesive.

The thermocouple wires 20a and 20b are passed through holes 21 of the supporting members 15b(15c) and the interiors of the drive rod 17a and of lift cylinder 17 and any other feed through (a wiring path between vacuum and atmosphere) to a signal processing apparatus 18 arranged outside of the processing chamber 10.

As above described, the substrate temperature measurement apparatus according to this embodiment is constituted by the chip 16, thermocouple wires 20a and 20b, supporting members 15a, 15b and 15c and signal processing apparatus 18.

Next, there will be described operations of the processing apparatus and substrate temperature measurement apparatus according to this embodiment.

The substrate 13 is supported by the three supporting members 15a, 15b and 15c in the processing chamber 10. The surface to be film-formed or ion-implanted is faced to the quartz plate 12. Infrared rays from the infrared ray heater 11 are radiated through the quartz plate 12 to the substrate 13 to be heated.

The heat of the heated substrate 13 is transferred to the chip 16 connected to the back surface of the substrate 13 and further to the ends of the thermocouple wires 20a and 20b united with the chip 16. The ends of the thermocouple wires united with the chip 16 function as a temperature-measuring point. A signal according to the temperature of the temperature measuring point is supplied to the signal processing apparatus 18. The measured temperature is displayed at a display portion of the signal processing apparatus 18.

The chip 16 is made, for example, of aluminum which is superior in thermal conductivity. Thus, the temperature of the substrate 13 is accurately measured. Of course, any other material superior in thermal conductivity may be used as material of the chip 16. For example, the material of thermal conductivity higher than 100[W/m·k] is preferable.

The reflection rate of aluminum to infrared rays is higher than that of ceramics used normally as the material of the prior art chip. The temperature rise of chip 16 by absorption of infrared rays can be decreased in contrast to the prior art chip. As a result, the temperature of the substrates depending on the heat transmitted from the substrate 13, can be accurately measured with the substrate temperature measurement apparatus of this embodiment.

The supporting members 15a, 15b and 15c supporting the chip 16 are made of quartz material of lower conductivity than that of the chip 16. Thus, thermal resistance between the chip 16 and the supporting members 15a, 15b and 15c is raised. The transmission of heat to the supporting members 15a, 15b and 15c from the substrate 13 through the chip 16 can be greatly suppressed. As a result, undesired temperature lowering of the chip 16 and that of the substrate 13 during heating can be suppressed. Further, since quartz is transparent to the infrared rays, the temperature rise of the supporting member 15a, 15b and 15c due to absorption of infrared rays can be suppressed. Accordingly, it is avoided that the temperature of the chip 16 is undesirably changed. The temperature of the substrate 13 can be accurately measured.

Figure 14:
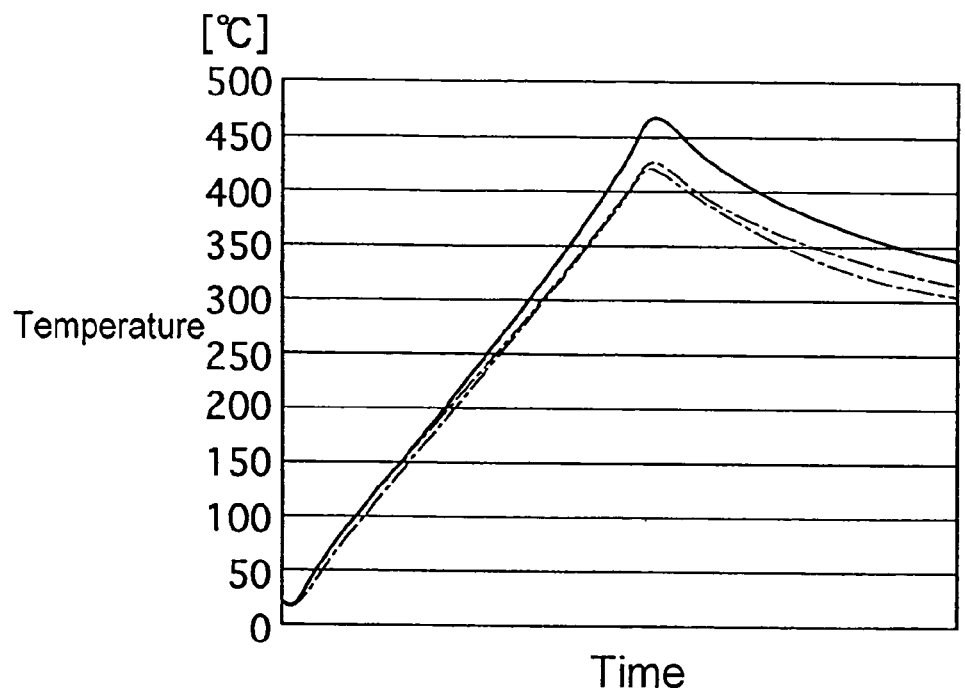
FIG. 14 is a graph of time-temperature changes of the substrate with a substrate temperature measurement apparatus (dot-dash line) according to the first embodiment of this invention and with the thermocouple wires directly connected to the substrate (solid line).
Figure 15:
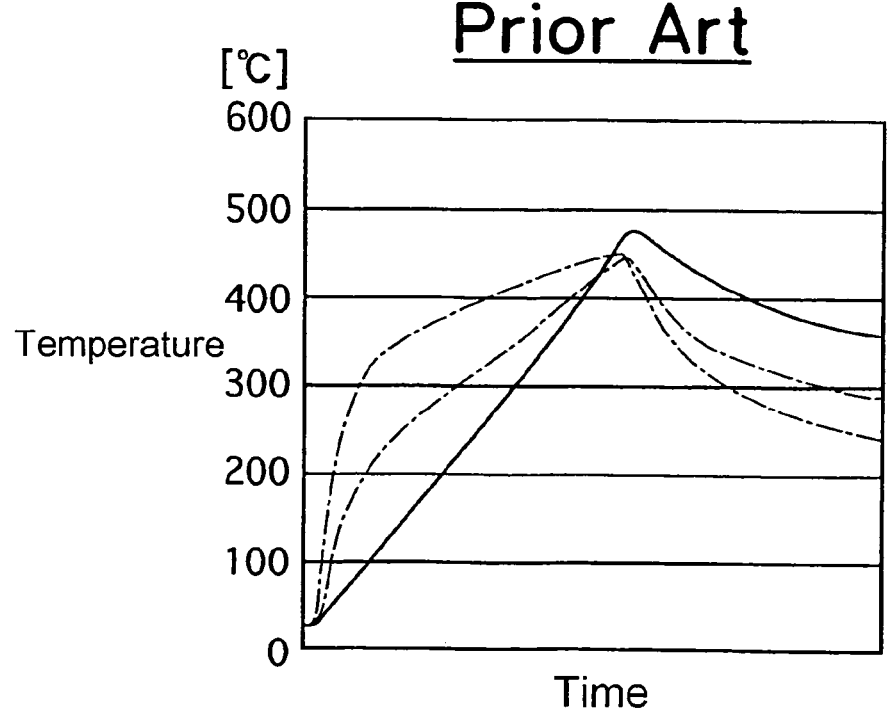
FIG. 15 is a graph of time-temperature changes of a substrate with a substrate temperature measurement apparatus according to the prior art (dot-dash line) and with the thermocouple wires directly connected to the substrate (solid line).

FIG. 14 is a graph of time-temperature changes of the substrate 13 (dot-dash line) with the substrate temperature measurement apparatus according to the first embodiment and (solid line) with the temperature measurement contact point of the thermocouple wires directly contacted with the substrate 13. The substrate 13 is silicon wafer on which a SiO2 film is wholly formed. Two dot-dash lines (temperature change curves) show the temperature measurement with the chip 16 supported on the supporting member 15b and the temperature measurement with the chip 16 supported on the supporting member 15c, respectively. As understood from the result, a temperature nearer to the actual temperature of the substrate 13 can be measured by this embodiment in contrast to the prior art shown in FIG. 15.

The chip 16 is contacted with the back surface of the substrate 13 opposite to the infrared ray heater 11. Also by such an arrangement, the influence of the infrared rays can be reduced on the chip 16.

The end portions of the thermocouple wires 20a and 20b, as the temperature measuring contact point, is united with the chip 16 by deformation or crushing of the latter at a normal temperature without a heating process. Thus, oxidation of the thermocouple wires 20a and 20b is avoided and therefore do not become fragile with heating. Accordingly, there is little fear of break down of the thermocouple wires 20a and 20b and they can have a long life. Further, since there is no heating process, the cost can be reduced. The mass of the crushed chip 16 does not change from that of the chip 16 before being crushed. The heat capacities of chips of the same material and the same size before being crushed are equal to each other. The response of the chips to the substrate temperature is almost constant.

Since the chip 16 contacts with the substrate 13, the material of the chip 16 is preferably softer than that of the substrate 13 so that the former does not damage the latter. In this embodiment, the chip 16 is made of aluminum which is softer than silicon or glass as the material of the substrate 13. Accordingly, it can be avoided that the chip 16 damages the substrate 13.

Since the chip 16 made of aluminum is soft, the contact surface area with the substrate 13 can be increased in comparison with a hard material such as ceramics. Accurately the temperature of the substrate 13 can be measured without varying. Particularly in the presence of some warp or some surface roughness, suitable contact area occasionally cannot be obtained. In that case, the above softer material of the chip 16 is advantageous.

For example, Al, Cu, Pt, Au and Ag fulfill all the requirements on the thermal conductivity, infrared ray reflection rate, easy deformability at the normal temperature, and hardness required for the chip 16. Al and Ag are preferable from the viewpoint of the protection from heavy metal contamination.

When aluminum is heated to 250 C. from the normal temperature, it has such a life time that the chip of aluminum can endure the use of about 5000 to 10000 times. Such metal as Ag having higher heat resistance can give longer life.

The lifetime of the chip depends on the wear due to the contact with the substrate 13 besides the deterioration due to heat. Accordingly, a longer life can be obtained by large sizing of the chip. However, heat capacity of the chip increases with the size. Response to the change of the temperature of the substrate 13 is lowered with the capacity. When a signal corresponding to the measured temperature is fed back to the infrared ray heater 11, to control the heat temperature of the substrate 13, accurate temperature control cannot be effected with large heat capacity. Accordingly, it is not preferable that the chip is overly large in size. For example, it is preferable that the longest length of the shape of the chip is smaller than 2 mm.

First Variation of the Chip

Figure 10:
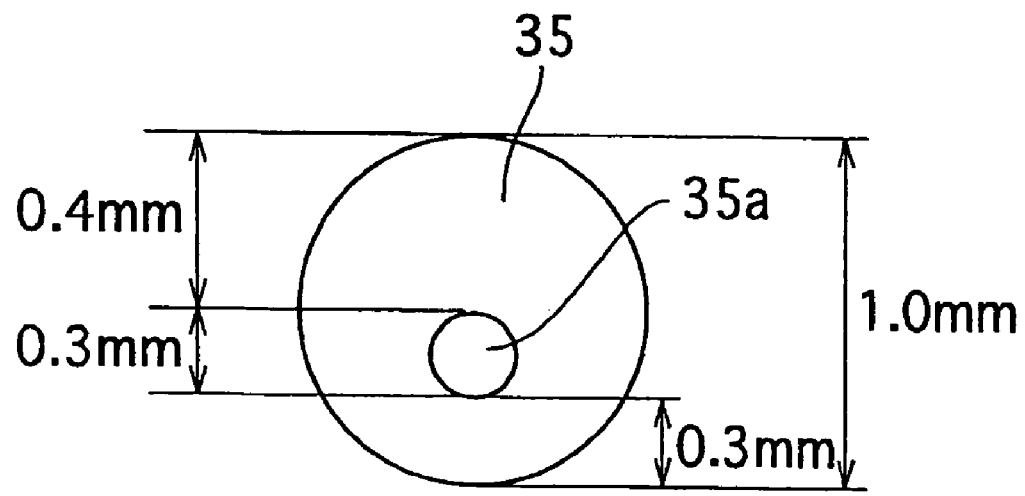
FIG. 10 is a side view of a variation of a chip (No. 1).

FIG. 10 shows a chip 35 according to a first variation of the chip. It is cylindrical before being crushed or deformed as the chip 16 shown in FIG. 9. The outer diameter of the chip 35 is equal to 1.0 mm which is smaller than that of the chip 16 according to the first embodiment. The top end of the chip 35 to be contacted with the substrate 13 is far from the insertion opening 35a by 0.4 mm, while the bottom end of the chip 35 to be contacted with the supporting member is far from the insertion opening 35a by 0.3 mm. Thus, the insertion opening 35a is shifted from the center of the chip 35. The inner diameter of the insertion opening 35a is equal to 0.3 mm.

With the above arrangement, the capacity of the chip 35 is not increased and so the response to the temperature change of the substrate 13 is not lowered. However, the resistance to wear of the contacting portion between the substrate 13 and the chip 35 can be raised.

Second Embodiment

Figure 4:
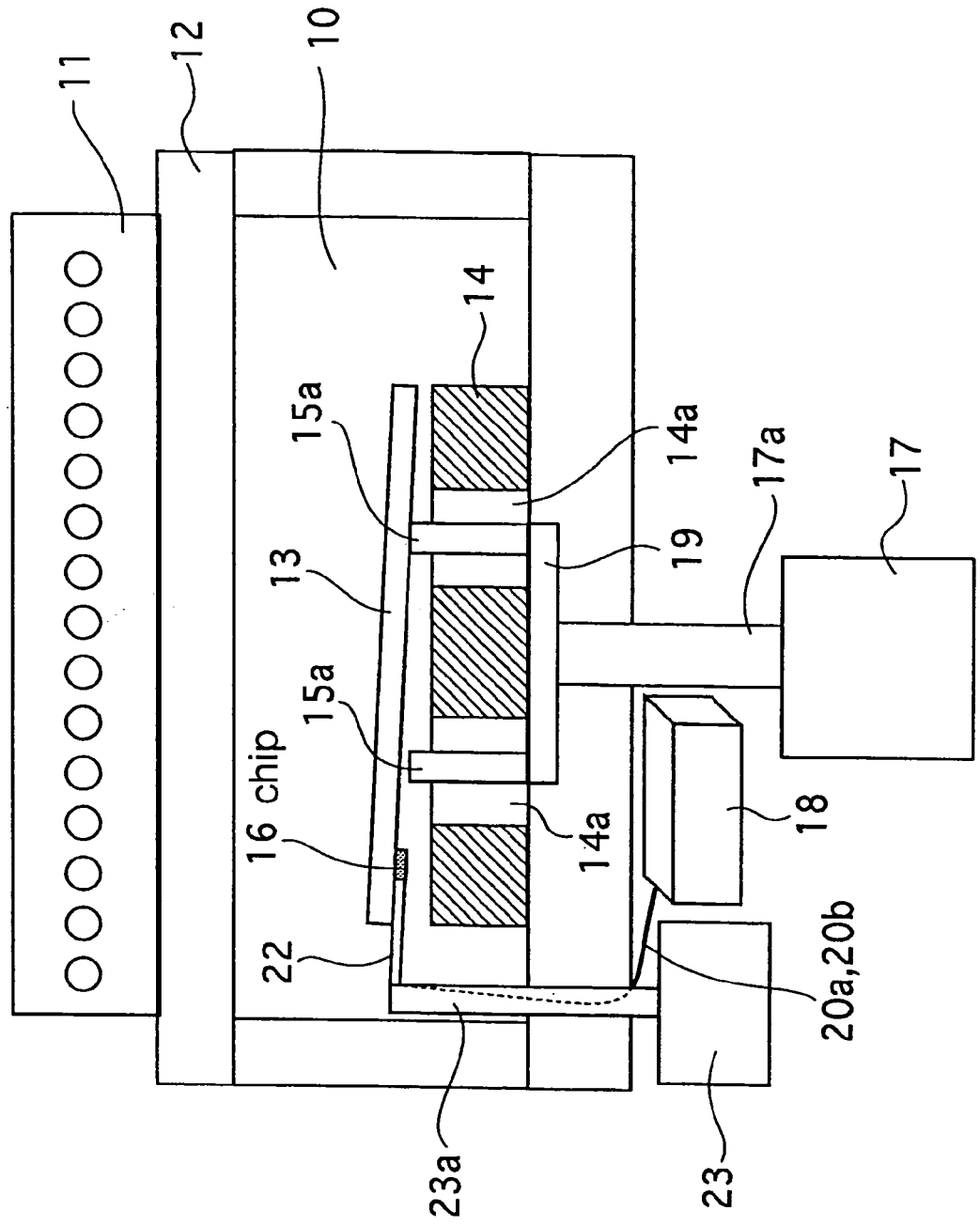
FIG. 4 is a schematic view of a processing apparatus and a substrate temperature measurement apparatus according to a second embodiment of this invention.

FIG. 4 shows a processing apparatus and a substrate temperature measurement apparatus according to a second embodiment of this invention. Parts which correspond to those of the first embodiment are denoted by the same reference numerals and the detailed description will be omitted.

In this embodiment, the chip 16 is supported on a plate-like supporting member 22. As shown in FIG. 4, it is attached to the top end of the supporting member 22 or it may be attached to an upper surface facing to the substrate 13. The supporting member 22 is made of quartz material as are the supporting members 15a, 15b and 15c of the first embodiment. The end of the supporting member 22 opposite to the one end of the supporting member 22 to which the chip 16 is attached is supported on a drive rod 23a of a lift cylinder 23 as a cantilever.

The lift cylinder 23 can not only lift but also rotate. It can move up and down. Further, it can rotate around the axis of the drive rod 23a in FIG. 4.

The top end of the supporting member 22 supporting the chip 16 is led between the substrate 13 and the stage 14, and the left side of the substrate 13 is raised up. The substrate 13 is separated slightly from the rod-like support member 15a. The chip 16 is contacted with the back surface of the substrate 13. Under the condition shown in FIG. 4, the substrate 13 may be heated and its temperature may be measured. Alternatively the substrate 13 may be positioned horizontally on the supporting member 15a by moving the drive rod 23a downwards, and the substrate 13 may be heated and its temperature may be measured. However, the contact area can be more stably secured in the condition shown in FIG. 4, since some load of the substrate 13 is applied onto the chip 16.

Third Embodiment

Figure 5:
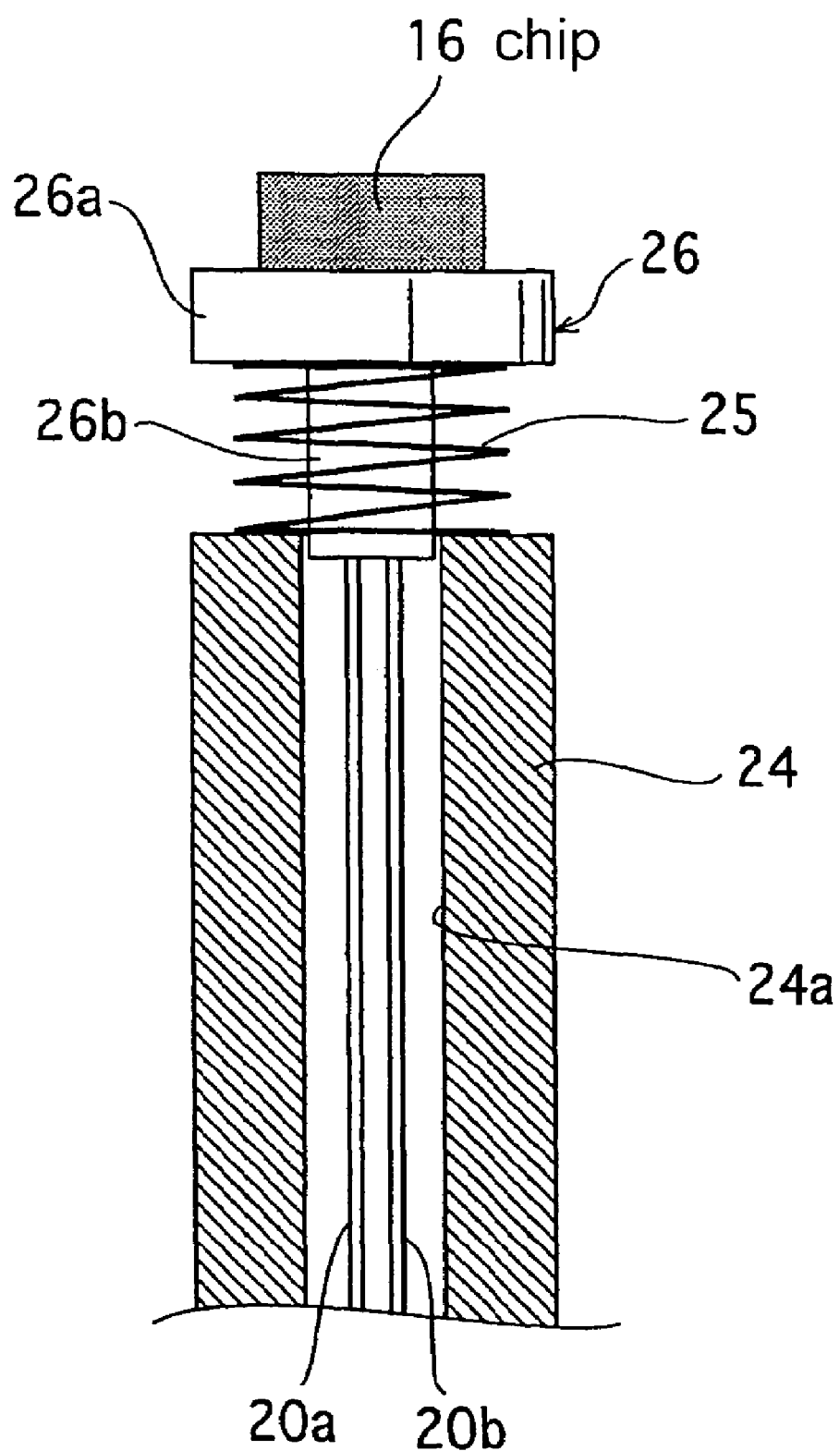
FIG. 5 is a cross sectional view of an important part of a substrate temperature measurement apparatus according to a third embodiment of this invention.

FIG. 5 shows the third embodiment of this invention. A T-shaped supporting member 26 in cross section, made of quartz material, is supported through a coil spring 25 on a top end of a cylindrical supporting member 24. The chip 16 is fixed to the upper surface of the supporting member 26, for example, with adhesive. The supporting member 24 is made of stainless. The coil spring 25 is wound around an axis portion 26b formed integrally with a head portion 26a of the supporting member 26. The axis portion 26b is cylindrical and its diameter is smaller than that of the head portion 26a. The coil spring 25 is supported on a top end of the supporting member 24. The upper end of the coil spring 25 contacts with the lower surface of the head portion 26a of the supporting member 26. The coil spring 25 constitutes the pushing means of this embodiment.

When the chip 16 contacts with the back surface of substrate 13 and some load of the substrate 13 is applied to the supporting member 26, the coil spring 25 is pressed down and the lower portion of the axis portion 26b is moved down in a hollow 24a of the supporting member 24. The restoring force of the pressed coil spring 25 functions to push the chip 16 onto the substrate 13. And so the contact surface area of the chip 16 and substrate 13 can be increased. The temperature can be accurately measured without variation. That is effective or advantageous in the case that a stable contact area cannot be obtained due to some warp of the substrate 13 and surface roughness of the latter.

Fourth Embodiment

Figure 6:
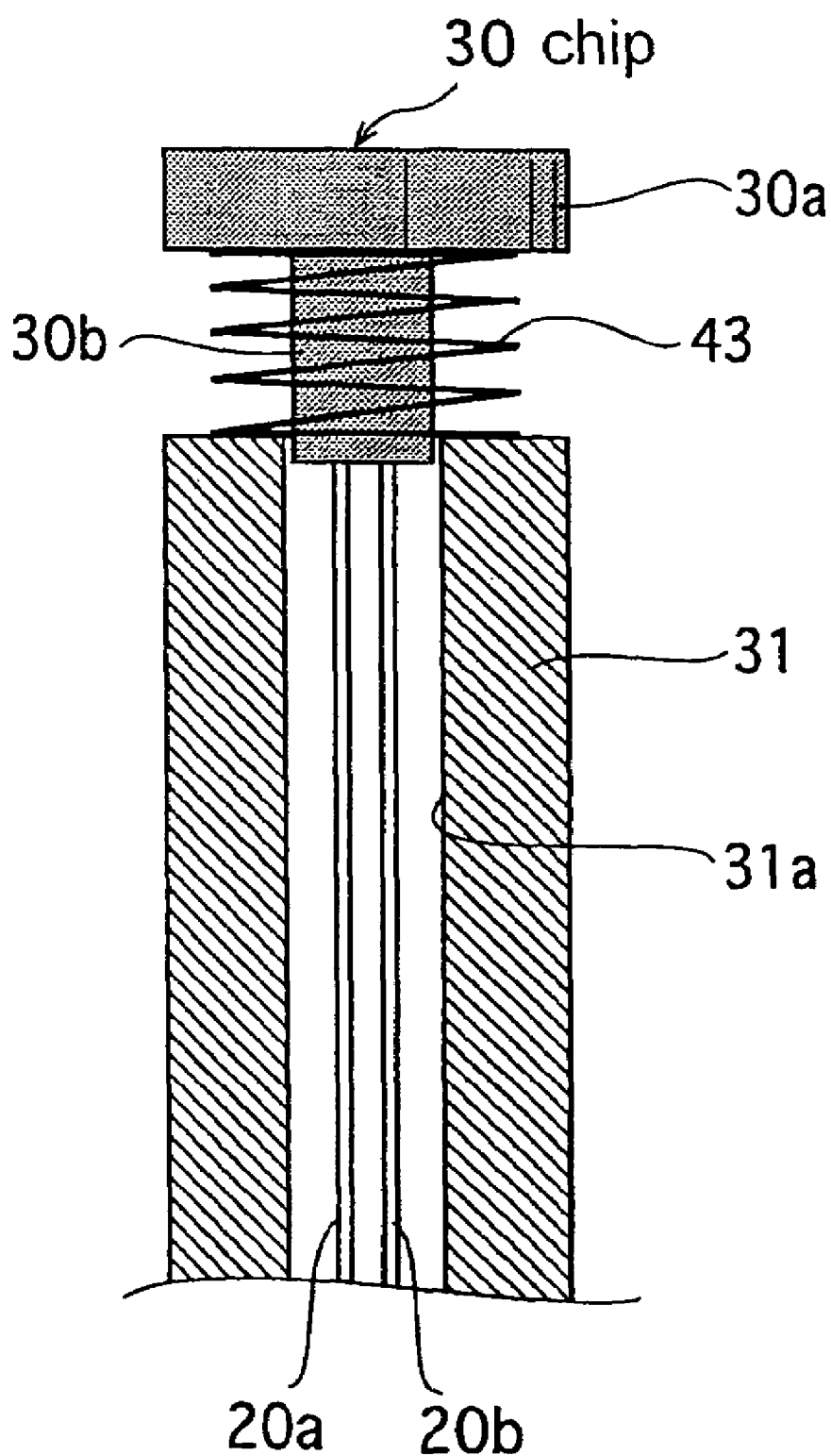
FIG. 6 is a cross sectional view of an important part of a substrate temperature measurement apparatus according to a fourth embodiment of this invention.

FIG. 6 shows the fourth embodiment of this invention. A T-shaped chip 30 in cross section is supported through a coil spring 43 on a top end of a cylindrical supporting member 31 made of quartz material. The chip 16 is made of any one of Al, Cu, Pt, Au and Ag. The coil spring 43 is wound around an axis portion 30b formed integrally with a head portion 30a of the chip 30. The axis portion 30b is cylindrical and its diameter is smaller than that of the head portion 30a. The coil spring 43 is supported on a top end of supporting member 31. The upper end of the coil spring 43 contacts with the lower surface of the head portion 30a of the chip 30. The coil spring 43 constitutes the pushing means of this embodiment.

When the chip 30 contacts with the back surface of substrate 13 and some load of the substrate 13 is applied to the chip 30, the coil spring 43 is pressed down and the lower portion of the axis portion 30b is moved down in a hollow 31a of the supporting member 31. The restoring force of the pressed coil spring 43 functions to push the chip 30 against the substrate 13 and accordingly the contact surface of the chip 30 and substrate 13 can be increased. The temperature can be accurately measured without variation. That is effective or advantageous in the case that a stable contact area cannot be obtained due to some warp of the substrate 13 and surface roughness of the latter.

The outer side of the chip 30 and 31 may be surrounded by a pipe made of stainless. In that case, it can be protected against any outer stress. Thus, it is avoided that an unexpected force is applied to the chip 30.

Fifth Embodiment

Figure 7:
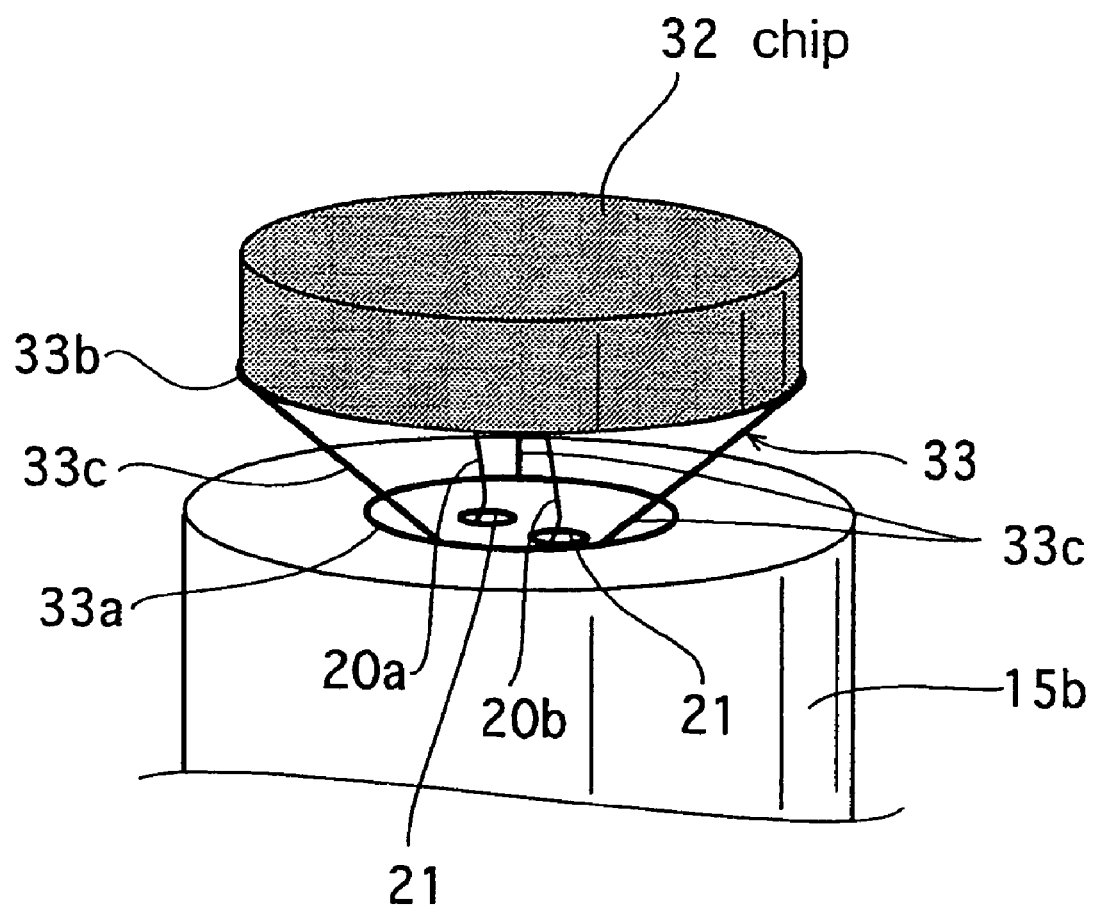
FIG. 7 is a perspective view of an important part of a substrate temperature measurement apparatus according to a fifth embodiment of this invention.

FIG. 7 shows a fifth embodiment. A cylindrical chip 32 is supported through shaking means 33 on the top end of the supporting member 15b made of quartz material. The chip 32 is made of any one of Au, Ag, Cu, Pt. and Au as the first embodiment.

The shaking means 33 is made, for example, of inconel. It consists of two rings 33a and 33b different from each other in diameter and three rods 33c connecting the two rings 33a and 33b. The ring 33a of the smaller diameter is fixed to a top end of the supporting member 15b and the ring 33b of the larger diameter is fixed to the chip 32, with adhesive.

The rods 33c are elastically inclined and bent individually. Thus, the chip 32 can be shaken above the supporting member 15b. Even when the substrate 13 is somewhat warped, the contact surface between the chip 32 and the substrate 13 can be increased and so the temperature of the substrate 13 can be measured accurately.

Sixth Embodiment

Figure 8:
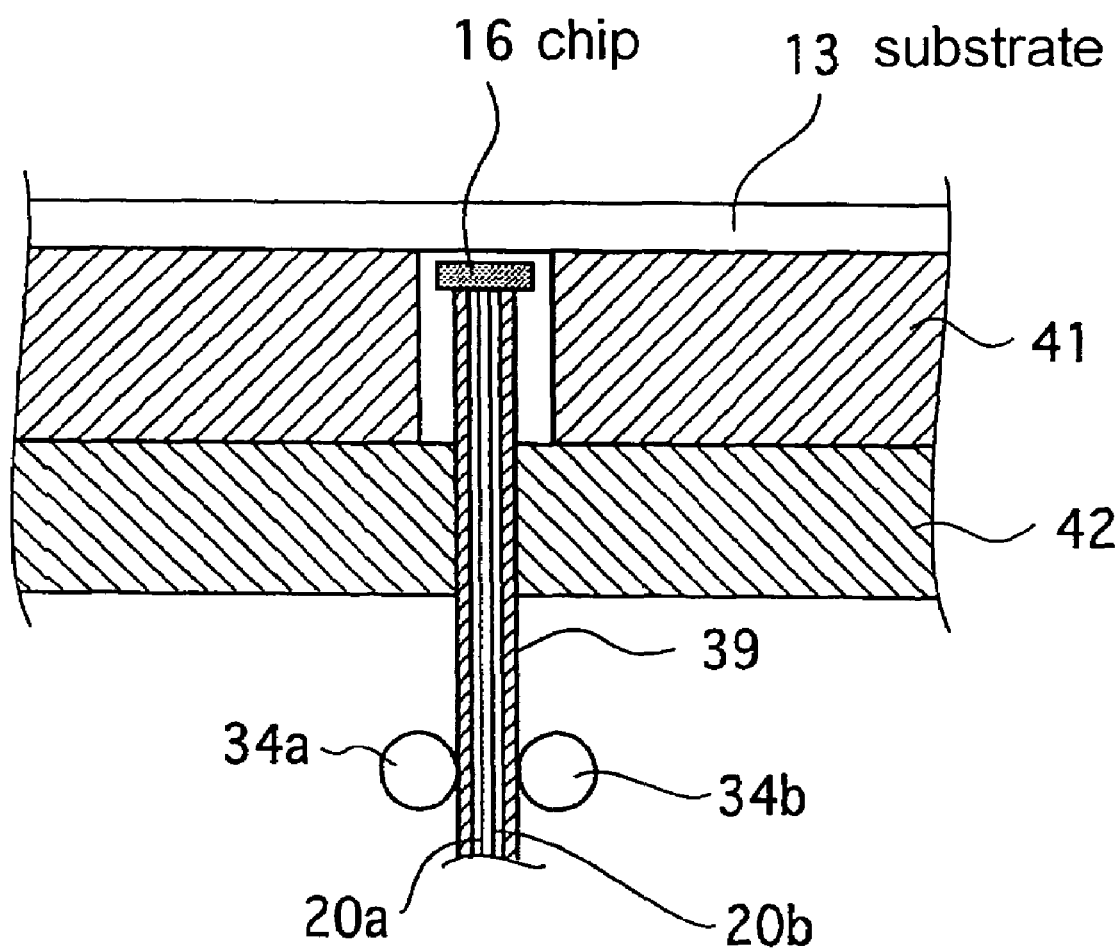
FIG. 8 is a cross sectional view of an important part of a substrate temperature measurement apparatus according to a sixth embodiment of this invention.

FIG. 8 shows a sixth embodiment. One pair of rollers 34a and 34b is used as the pushing means to push the chip 16 against the substrate 13. The chip 16 is fixed to the top end of a rod-like supporting member 39 made of quartz. The supporting member 39 is movable upwards and downwards in the thickness direction of a bottom wall 42 of the processing chamber 10 and a substrate support mount 41. The supporting member 39 pinched between the rollers 34a and 34b is moved upwards with rotation of the rollers 34a and 34b. The chip 16 is pushed against the substrate 13. The chip 16 is contacted at a suitable contact pressure to the substrate 13 by torque control of a motor driving the rollers 34a and 34b.

While the preferred embodiments of the Invention have been described, without limitation to this, variations thereto will occur to those skilled in the art within the scope of the present inventive concepts that are delineated by the following claims.

The material of the supporting member is not limited to quartz. Any other material of low heat conductivity such as ceramics may be used. The example for the low heat conductivity is polyimide resin and ZrO. However, their infrared-ray absorption rate is high. Accordingly, they should be arranged so that they are obstructed from the rays of the infrared heater by the chip. Reflective material for the infrared rays, such as aluminum, TiN, and Au may be coated on the surface of the above material.

It is preferable in the embodiment of FIG. 5 and FIG. 6 that the coil spring is so strong that it is not appreciably shrunk by the weight of the substrate 13 and the chip does not contact with the support member. The heat transfer between the chip and the support member is intercepted.

Figure 11:
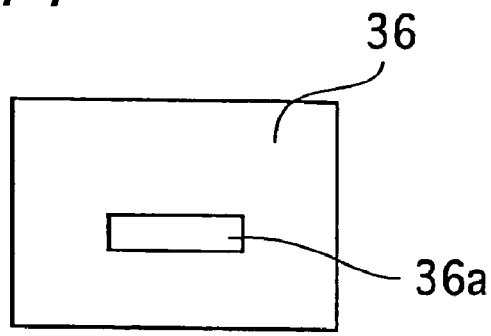
FIG. 11 is a side view of a variation of a chip (No. 2).
Figure 12:
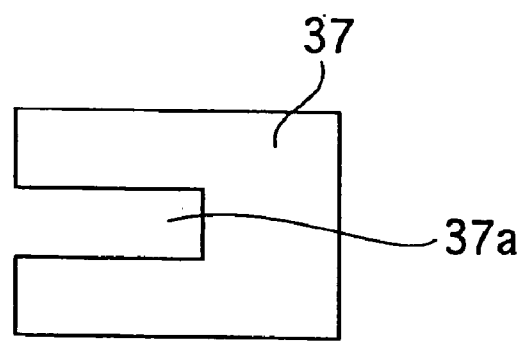
FIG. 12 is a side view of a variation of a chip (No. 3).
Figure 13:
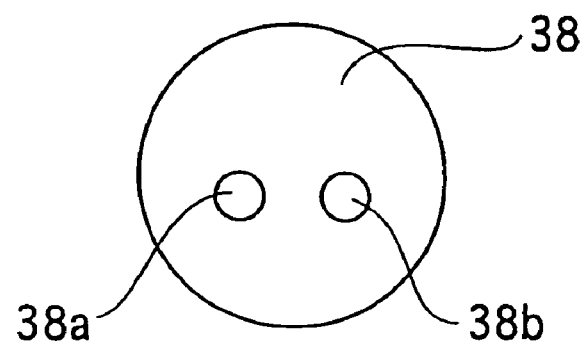
FIG. 13 is a side view of a variation of a chip (No. 4).

The shape of the chip is not limited to a cylinder. It may be rectangular as a chip 36 shown in FIG. 11. Further, an insertion opening 36a may be square in side view, or it may be U-shaped as a chip 37 shown in FIG. 12. The number of the insertion openings is not limited to one. It may be two as insertion openings 38a and 38b of a chip 38 shown in FIG. 13. Thermocouple wires 20a and 20b are inserted into the two, respectively.

In the above embodiments, the spaces 14a are formed in the stage 14. The supporting members 15a, 15b and 15c are raised through the spaces 14a. The chip 16 is supported on the one of the supporting members 15a, 15b and 15c. FIG. 16 shows a variation of the substrate temperature measurement apparatus of the above embodiment. Mounts 50 made of quartz material are fixed on the stage 14. The chips 16 are attached on the mounts 50. The thermocouple wires are led through spaces 14a' to the outside.

In the above embodiments, the substrate 13 is heated by the infrared ray heater 11 as shown in FIG. 1. When a film is formed on a bare silicon wafer as the substrate 13 under the measured and controlled temperature, by sputtering, plasma is generated above the substrate. Electromagnetic waves easily pass through the bare silicon wafer under the plasma light and electromagnetic waves. Generally, it is difficult to measure accurately the temperature of the processed substrate in that case. The temperature of the substrate can be accurately measured without influence of plasma light, according to this invention.

The invention claimed is:

1. A substrate temperature apparatus for measuring the temperature of a substrate, said apparatus comprising:
    a chip made of metal material reflecting infrared rays and other electromagnetic waves;
    said chip having an insertion opening for inserting thermocouple wires and which chip is crushed and thereby deformed with said thermocouple wires inserted to unite said chip together with said thermocouple wires;
    said chip contacted with said substrate; and
    a supporting member or members, made of material of lower thermal conductivity than said chip, supporting said chip.

2. A substrate temperature measurement apparatus according to claim 1 which is provided with pushing means for pushing said chip against said substrate.

3. A substrate temperature measurement apparatus according to claim 1 which is provided with shaking means for enabling said chip to shake on said supporting member.

4. A substrate temperature measurement apparatus according to claim 1 in which said chip is made of any one material selected from Al, Cu, Pt, Au and Ag.

5. A substrate temperature measurement apparatus according to claim 1 which said supporting member is made of quartz material.

6. A substrate temperature measurement apparatus according to claim 1 in which said insertion opening is so shifted from the center of said chip that the distance between said insertion opening and the contact point of said substrate and said chip is no longer than the distance between the portion of said chip facing to said support member and said insertion opening.

7. A method for measuring the temperature of a substrate, the method comprising:
    providing a chip of metal material which reflects infrared rays and other electromagnetic waves;
    inserting thermocouple wires into an insertion opening provided in said chip;
    crushing and thereby deforming said chip with said thermocouple wires inserted to unite said chip and said thermocouple wires together;
    contacting said crushed chip with said substrate; and
    supporting said chip with a material of lower thermal conductivity than said chip.

8. The method of claim 7, including the step of constantly urging said chip against said substrate.

9. The method of claim 7, including the step of shaking said chip on said supporting member.

10. The method of claim 7, wherein said chip is made of any one material selected from Al, Cu, Pt, Au and Ag.

11. The method of claim 7, wherein said supporting member is made of quartz material.

12. The method of claim 7, wherein said insertion opening is so shifted from the center of said chip that the distance between said insertion opening and the contact point of said substrate and said chip is no longer than the distance between the portion of said chip facing to said support member and said insertion opening.

13. The method of claim 7, wherein said chip is contacted with a back surface of said substrate, a front surface of which receives infrared rays or electromagnetic waves.

* * * * *